(12) United States Patent
Li et al.

(10) Patent No.: US 8,457,847 B2
(45) Date of Patent: Jun. 4, 2013

(54) METHOD FOR DETECTING POWERTRAIN TORQUE OUTPUT

(75) Inventors: Dongxu Li, Warren, MI (US); Kumaraswamy V. Hebbale, Troy, MI (US); Chunhao I. Lee, Troy, MI (US); Farzad Samie, Franklin, MI (US); Chi-Kuan Kao, Troy, MI (US); Ming Cao, Glastonbury, CT (US)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

(21) Appl. No.: 12/892,832

(22) Filed: Sep. 28, 2010

(65) Prior Publication Data

US 2012/0078475 A1   Mar. 29, 2012

(51) Int. Cl.
*G06F 7/00* (2006.01)

(52) U.S. Cl.
USPC .............................................. 701/51; 475/86

(58) Field of Classification Search
USPC ........ 701/51, 67, 93, 22, 69, 70, 55; 180/248, 180/197, 250, 65.6; 192/35, 84.93, 218, 54.52; 475/198, 86, 249, 149, 5
See application file for complete search history.

(56) References Cited

U.S. PATENT DOCUMENTS

| 7,559,259 B2 * | 7/2009 | Fruhwirth et al. ........ 73/862.321 |
| 2008/0011103 A1 | 1/2008 | Fruhwirth et al. |
| 2012/0094800 A1 * | 4/2012 | Suzuki et al. ..................... 477/3 |

FOREIGN PATENT DOCUMENTS

| DE | 19530677 A1 | 2/1997 |
| DE | 19540899 B4 | 6/2012 |

* cited by examiner

*Primary Examiner* — Thomas Black
*Assistant Examiner* — Luke Huynh

(57) ABSTRACT

A powertrain includes a transmission coupled to a driveline. A method for monitoring torque of the driveline includes monitoring signals from first and second rotational sensors located at respective first and second rotationally-coupled positions of the driveline separated by a distance along the driveline, determining rotation of the driveline at the first and second rotationally-coupled positions from said signals, determining a twist angle derived from a difference between the rotations of the driveline at the first and second rotationally-coupled positions, calculating a driveline torque corresponding to the twist angle, and controlling operation of the powertrain in response to the driveline torque.

14 Claims, 3 Drawing Sheets

METHOD FOR DETECTING POWERTRAIN TORQUE OUTPUT

TECHNICAL FIELD

This disclosure is related to driveline operation and determining torque output of a vehicular powertrain.

BACKGROUND

The statements in this section merely provide background information related to the present disclosure and may not constitute prior art.

A consideration of vehicle driveability is powertrain output and vehicle response to that output. Powertrain output can be referred to as a twisting force known as torque. Torque is the twisting force generated from an internal combustion engine, or other torque source, e.g., electric motor, to propel the vehicle. In the case of an automobile or other vehicle with drive wheels, torque may be transferred through a transmission, split by a differential, and provided to wheels to provide tractive force to the vehicle.

Torque information can be used in a variety of powertrain control schemes, e.g., clutch fill-time detection, engine torque estimation, transmission shift smoothing, etc., which aid in vehicle drivability. Therefore, torque information can be used for added control of the powertrain. For example, during acceleration and deceleration, occupants of a vehicle can detect changes in torque transferred, e.g., during transmission shifts. Control schemes that control the transmission shifting can be utilized to minimize torque disturbances during shifting. A closed-loop control scheme can be used for transmission shifting allowing a control module to estimate the amount of torque being produced in a current transmission gear ratio based on an amount of torque the engine should be producing at a given RPM. However, this is a theoretical torque and not necessarily representative of the actual torque being transferred. A control scheme can be devised for engine and transmission control based on a dedicated torque sensor. Dedicated torque sensors are able to detect an actual amount of torque being transferred and provide the actual torque information to the control module for determining a transmission shift scheme based on current conditions. However, dedicated torque sensors for use in production vehicles increase cost, part content, wiring harness complexity, mass and reliability issues.

SUMMARY

A powertrain includes a transmission coupled to a driveline. A method for monitoring torque of the driveline includes monitoring signals from first and second rotational sensors located at respective first and second rotationally-coupled positions of the driveline separated by a distance along the driveline, determining rotation of the driveline at the first and second rotationally-coupled positions from said signals, determining a twist angle derived from a difference between the rotations of the driveline at the first and second rotationally-coupled positions, calculating a driveline torque corresponding to the twist angle, and controlling operation of the powertrain in response to the driveline torque.

BRIEF DESCRIPTION OF THE DRAWINGS

One or more embodiments will now be described, by way of example, with reference to the accompanying drawings, in which.

DETAILED DESCRIPTION

Figure 1:
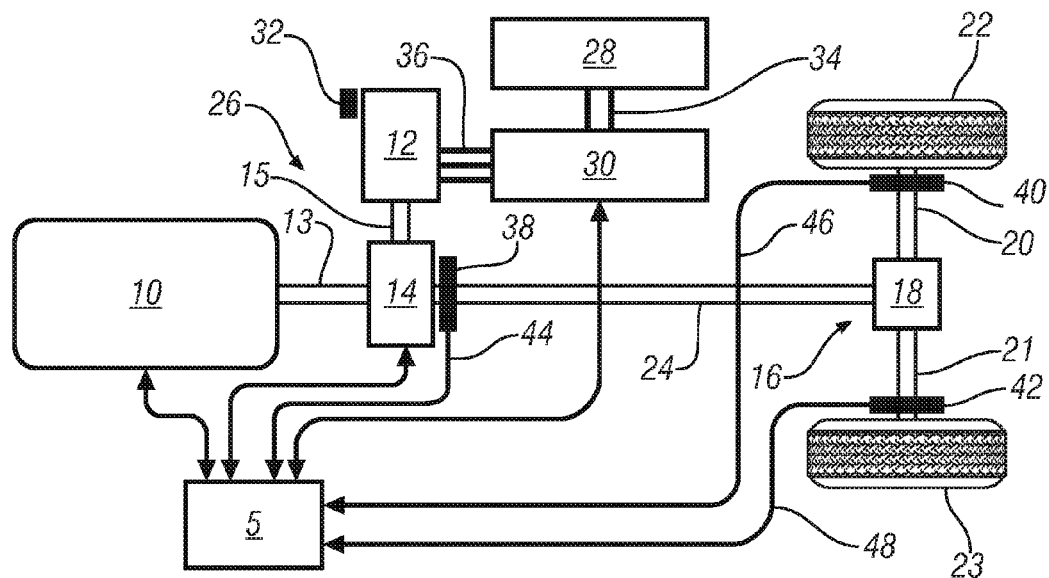
FIG. 1 is a schematic depiction of a hybrid powertrain system including an internal combustion engine and motor/generator(s), in accordance with the present disclosure.

Referring now to the drawings, wherein the showings are for the purpose of illustrating certain exemplary embodiments only and not for the purpose of limiting the same, FIG. 1 schematically shows a hybrid powertrain system 26 including an internal combustion engine 10 and motor/generator(s) 12. It should be noted that the hybrid powertrain is illustrative of this disclosure and should not be considered restrictive as different types of hybrid powertrains and non-hybrid powertrains are contemplated herein. The engine 10 can be coupled to a transmission device 14 to transmit tractive torque to a driveline 16 of a vehicle. The driveline 16 includes mechanically coupled output member 24, differential gear device 18, first and second half-shafts 20 and 21 mechanically coupled to first and second wheels 22 and 23, respectively, in one embodiment. The driveline 16 transfers tractive power between the transmission 14 and a road surface via the first and second wheels 22, 23.

The hybrid powertrain system 26 includes an energy storage device (ESD) 28, e.g., a battery, that stores electrical energy and is electrically connected to one or more electric motor/generator(s) 12, to transfer power therebetween. A transmission power inverter control module (TPIM) 30 is positioned between the ESD 28 and the motor/generator(s) 12 and is used to transform battery power from direct current to alternating current and back again. The motor/generator(s) 12 convert stored energy to mechanical power and convert mechanical power to energy that can be stored in the ESD 28. The engine 10 converts fuel to mechanical power.

The motor/generator(s) 12 preferably include a three-phase AC machine(s), including a stator, a rotor, and a resolver(s) 32. The motor stator for motor/generator(s) 12 is grounded to an outer portion of a transmission case, and includes a stator core with coiled electrical windings extending therefrom. The rotor(s) for the motor/generator(s) 12 are secured to transfer torque through the transmission 14 to the driveline 16 via shaft 15.

The resolver(s) 32 preferably includes a variable reluctance device including a resolver stator and a resolver rotor. The resolver(s) 32 are appropriately positioned and assembled on the motor/generator(s) 12. The respective stator(s) of the resolver(s) 32 are connected to the stator(s) for the motor/generator(s) 12. The resolver rotors are connected to the rotor for the motor/generator(s) 12. The resolver(s) 32 is signally and operatively connected to the TPIM 30 and senses and monitors rotational position of the resolver rotor relative to the resolver stator, thus providing actual rotational position of the motor/generator(s) 12. Additionally, the signal output from the resolver(s) 32 is interpreted to provide the rotational speed for the motor/generator(s) 12. When an electric only mode is providing torque to the drivetrain 16, the resolver is capable of providing rotational information similar to a rotational sensor.

The input torque from the engine 10 and the motor torques from the motor/generator(s) 12 are generated as a result of energy conversion from fuel or electrical potential energy stored within the ESD 28. The ESD 28 is high voltage DC-coupled to the TPIM 30 via DC transfer conductors 34. The transfer conductors 34 provide switchable electric current flow between the ESD 28 and the TPIM 30. The TPIM 30 transmits electrical power to and from the motor/generator(s) 12 by transfer conductors 36 to meet the torque commands in response to a motor torque request. Electrical current is transmitted to and from the ESD 28 in accordance with whether the ESD 28 is being charged or discharged.

Mechanical power from the engine 10 can be transferred to the transmission 14 via shaft 13. Mechanical power from the motor/generator(s) 12 can be transferred to the transmission 14. Mechanical power from the driveline 16 can be transferred to the engine 10 and the torque machine(s) 16 via the transmission 14 via the output member 24. The engine 10 is utilized in combination with the motor/generator(s) 12 for transferring torque to the driveline 16 thereby providing tractive torque through the first and second wheels 22, 23. The transferred mechanical power can be in the form of tractive torque for vehicle propulsion, and in the form of reactive torque for vehicle braking associated with regenerative braking functionality. As will be apparent to one of ordinary skill in the art, other hybrid configurations, e.g., series hybrid, parallel hybrid, or compound hybrid drive, non-hybrid configurations, and electric drive vehicles may be used without varying from the scope of the disclosure.

An output rotational sensor 38 is positioned on the output member 24 preferably near the transmission 14. In a first embodiment, a first rotational sensor 40 is positioned distally relative to the output rotational sensor 38 on one of the half-shafts. It is appreciated that the output rotational sensor 38 is rotationally coupled to the first rotational sensor 40 vis-à-vis the output member 24 and differential 18. In a second embodiment, additionally a second rotational sensor 42 is positioned distally relative to the output rotational sensor on the other one of the half-shafts. It is appreciated that the output rotational sensor 38 is rotationally coupled to the first and second rotational sensors 40, 42 vis-à-vis the output member 24 and differential 18. For purposes of this description, the first rotational sensor 40 corresponds to the first half-shaft 20 and the second rotational sensor 42 corresponds to the second half-shaft 21. The first and second rotational sensors 40, 42 are preferably positioned adjacent to corresponding first and second wheels 22, 23. In yet a third embodiment as an alternative to either the first or second embodiments, a rotational sensor is positioned distally relative to the output rotational sensor 38 but still on the output member 24 (e.g. adjacent the differential 18). Thus, it is appreciated that in all embodiments the output rotational sensor 38 is rotationally coupled to at least one additional distally-positioned rotational sensor. The output rotational sensor 38, first rotational sensor 40 and second rotational sensor 42 are signally connected to a control module 5 to provide signals thereto. When the hybrid powertrain system 26 is being operated in electric only mode, the resolvers 32 can provide the rotational information of the output rotational sensor 38 when transmission losses are calculated therewith. The control module 5 is signally and operatively connected to the engine 10 and TPIM 30 for providing communication therebetween and control thereof.

Each of the output, first, and second rotational sensors 38, 40, 42 are rotational sensors from which speed can be derived. Signals from the rotational sensors are substantially periodic during constant or steady state rotation of the driveline. An exemplary rotational sensor may include a toothed gear fabricated from a ferromagnetic material secured to a rotating element, e.g., a rotating shaft, which passes by a hall-effect sensor. Each tooth that passes the sensor produces signals that can be discerned in number, by duration, dwell, and by amplitude. A full signal corresponds to a tooth time period (i.e. from the beginning or ending of a tooth to the same beginning or ending of an adjacent tooth). A partial signal corresponds to a portion of a tooth time period. Since the number of teeth on the toothed gear is known, a speed can be calculated by counting full and partial signals produced within a sample window. Other exemplary sensors are bearingless wheelset, wheelset pulse generator, optical, and similar wheel rotational sensors producing periodic signals.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 can control the hybrid powertrain system 26 to produce torque in response to an operator torque request. The control module 5 controls the engine 10, the motor/generator(s) 12, and the transmission 14 in combination to produce the operator torque request. The control module 5 can command the engine 10 and motor/generator(s) 12 to produce the requested torque individually or in combination. The transmission 14 is controlled to selectively transmit torque to the driveline 16 and includes multiple gear ratios that act as a torque multiplier to achieve the final operator torque request. Torque output can be used to control operation of the hybrid powertrain system 26 in response to the operator torque request using a suitable torque control scheme.

Figure 2:
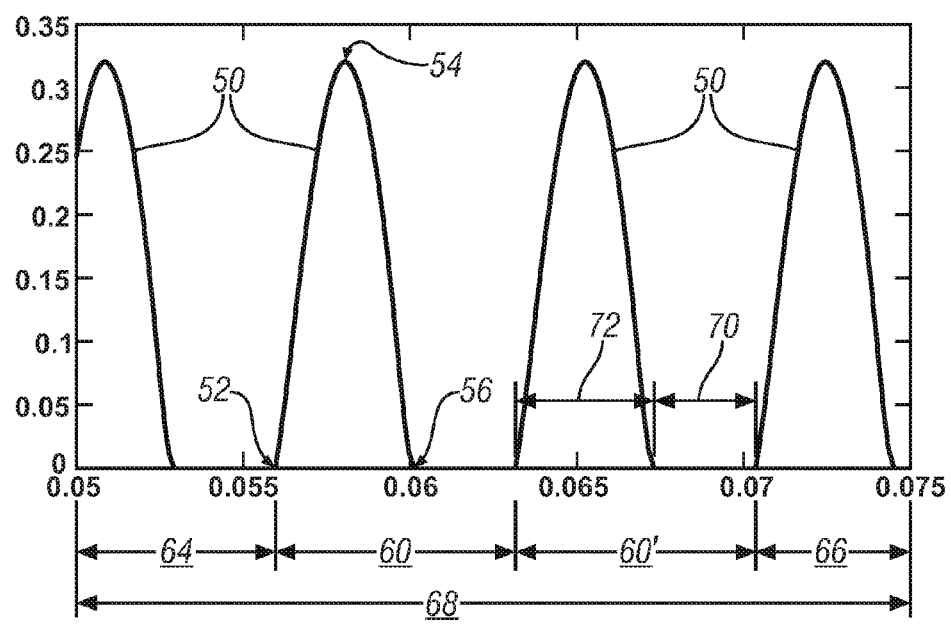
FIG. 2 is a graphical representation of exemplary data from a rotational sensor over a specified time period, in accordance with the present disclosure.

FIG. 2 is a graphical representation of exemplary data from an exemplary rotational sensor signally coupled to a rotatable element including a toothed gear over a specified time period, e.g., 25 ms. Exemplary rotational sensors include the output, first, and second rotational sensors 38, 40, 42 and exemplary rotatable elements include the output member 24, the first half-shaft 20, and the second half-shaft 21. When the rotatable element rotates, the toothed gear rotates. A signal 50 is generated as each tooth passes the rotational sensor. A full signal has a profile that includes a starting point 52, a peak 54, an ending point 56 and dwell 70. The elapsed time between the starting point 52 and the ending point 56 is signal duration 72. The elapsed time between the ending point 56 of one output signal 50 and the starting point 52 of an adjacent, subsequent output signal 50 is dwell 70. The combined signal duration 72 and dwell 70 is a signal period 60.

When the rotatable element rotates at a constant speed, a periodic pattern emerges. When the rotation speed increases, the signal duration 72 and the dwell 70 between each sensed tooth decreases, thereby causing a shorter signal period, e.g., 60'. As the rotation speed increases, an increase in the number of teeth sensed during a given sample window 68 also increases. When the rotation speed decreases, the signal duration 72 and the dwell 70 between each output signal increases, thereby causing a longer signal period. As the rotation speed decreases, the number of teeth sensed during the given sample window 68 also decreases.

For each of the output, first, and second rotational sensors 38, 40, 42 an angle of rotation $\Theta$ can be determined based on a comparison of a common sample window, e.g., 25 ms, for each sensor. The angle of rotation $\Theta$ is the magnitude of shaft rotation as measured in degree angles. Other suitable metrics such as radians can be used. By comparing the angles of rotation $\Theta$ from two rotational sensors, e.g., the output rotational sensor 38 and the first rotational sensor 40, a twist angle therebetween can be determined and related torque value calculated. An angle of rotation $\Theta$ can be calculated by determining a phase angle $\varnothing$ for an initial signal and a final signal, $\varnothing$init and $\varnothing$final respectively, and the number of intermediate signals within the sample window 68. The initial phase angle $\varnothing$init is determined by knowing a first signal period t1 64 (measured from the beginning of the sample window 68 to the ending point of the first sensed tooth output), a reference full signal period (preferably the subsequent or preceding adjacent signal period—e.g. P1 measured from the starting point of the first full sensed tooth output to the starting point of the next sensed tooth output, or alternatively a temporally close subsequent or preceding signal period, and the total number of teeth Nt on the sensor as determined by the following equation. It will be appreciated that the first signal period t1 64 may encompass only a portion of a full signal period.

$$\varnothing_{init} = \left[\frac{t1}{(Nt \cdot P1)}\right]360 \qquad [1]$$

The final phase angle $\varnothing$final is determined by knowing a last signal period t2 66 (measured from starting point of the last sensed tooth output to the end of the sample window 68), a reference full signal period (preferably the subsequent or preceding adjacent signal period—e.g. P2 measured from the starting point of the last full sensed tooth output to the starting point of the last sensed tooth output, or alternatively a temporally close subsequent or preceding signal period, or an average of temporally close full signal periods), and the total number of teeth Nt on the sensor as determined by the following equation. It will be appreciated that the last signal period t2 66 may encompass only a portion of a full signal period.

$$\varnothing_{final} = \left[\frac{t2}{(Nt \cdot P2)}\right]360 \qquad [2]$$

The overall angle of rotation $\Theta r(i)$ during the sample window 68 can be calculated for the specific sensor as the summation of the initial and final phase angles and an intermediate phase angle in accordance with the following equation:

$$\Phi r(i) = \varnothing init(i) + \varnothing final(i) + \left(\frac{Nw(i)}{Nt}\right) \cdot 360 \qquad [3]$$

where i is the index of the sample window, e.g., 25 ms, and Nw(i) is the number of complete teeth sensed, and $$\left(\frac{Nw(i)}{Nt}\right) \cdot 360$$

is the intermediate phase angle. Therefore, an accumulated rotation over time can be calculated by the following equation.

$$\Theta r(N) = \Sigma \Phi r(i) \qquad [4]$$

Since the initial and final phase angles are estimated using the full signal periods 60, 60' nearby the limits of the sample window 68, errors can be introduced since signal periods during the sample window may change. Therefore, a constraint is introduced to ensure the sum of a final phase angle of the previous sample window 68 and an initial phase angle of the current sample window 68 is equivalent to the angle of rotation of a full signal period as follows.

$$\varnothing_{init(i+1)} + \varnothing_{final(i)} = \frac{360}{Nt} \qquad [5]$$

Once the angle of rotation $\Theta$ is known for each of the output, first, and second rotational sensors 38, 40, 42, the twist angle and torque variation for the output member 24 during the sample window can be determined by the following equation:

$$Tom = Keq \cdot \left[\Theta om - \left(\frac{\Theta 1 + \Theta 2}{2}\right) \cdot Rt\right] \qquad [6]$$

where Tom is the torque on the output member 24, Keq is the representative stiffness between the output sensor 38 and the first and second rotational sensors 40, 42, $\Theta$om is the angle of rotation at the output rotational sensor 38 located on the output member 24 during the sample window, $\Theta$1 is the angle of rotation at the first rotational sensor 40 located on the first half-shaft 20 during the sample window, $\Theta$2 is the angle of rotation at the second rotational sensor 42 located on the second half-shaft 21 during the sample window, and Rt is the ratio of the differential. The linear coefficient Keq of Eq. [6] can be represented as follows:

$$Keq = \frac{2 \cdot Kom \cdot \overline{Khs}}{2 \cdot \overline{Khs} + Kom \cdot \eta \cdot Rt^2} \qquad [7]$$

where Kom is the stiffness of the output member, η is the differential efficiency, and $\overline{Khs}$ is the equivalent material stiffness combining both half shafts, which can be written as follows.

$$\overline{Khs} = \frac{2 \cdot Khs1 \cdot Khs2}{Khs1 + Khs2} \qquad [8]$$

Here, Khs1 and Khs2 are the stiffness of the first and second half-shafts, respectively. In Eq. [6], the change in rotational angle is represented as follows.

$$\Theta rot = \Theta om - \left(\frac{\Theta 1 + \Theta 2}{2}\right) \cdot Rt \qquad [9]$$

It will be apparent that Eq. [6] calculates rotation based on angle incrementing of the respective teeth of the rotational sensors. Since the initial angle of rotation is unknown, the torque calculated is relative torque over time once the rotational sensors are able to produce appropriate data. Positional identifiers on each rotational sensor can be utilized to enable absolute torque determinations. Additional details respecting absolute torque determination can be found in commonly owned and co-pending U.S. application Ser. No. 12/892,838, the contents of which are incorporated herein by reference.

It will be apparent that any output from a rotational sensor can be utilized for the above rotational angle calculations. The calculations only require one intermediate full signal period and partial initial and final signal periods, e.g., 64, 66, within the sample window. It will be apparent that as described above that partial initial and final signal periods may include full signal periods.

The sample window 68 can be adjusted based on the specific vehicle to be monitored, vehicle speed, or other design considerations. In one embodiment, the sample window 68 is adjusted based on the vehicle speed. The sample window 68 can be continuously adjusted or adjusted in discrete sample window increments based on current speed. In either case, the sample window 68 is sized such that at least one signal period, e.g., 60, 60', is detected. One signal period is necessary to calculate the angular rotation, and therefore, is necessary to calculate torque. Therefore, sample window 68 adjustment is based on speed, e.g., vehicle speed or shaft rotational speed, includes using longer sample window s for slower speeds and shorter sample windows for higher speeds for both increasing and decreasing speeds. An exemplary set of discrete sample window increments based on vehicle speed is disclosed in Table 1 and is illustrative of the disclosure.

TABLE 1

| Window Size (msec) | 10 | 25 | 50 |
|---|---|---|---|
| Minimum Speed (mph) | 33.8 | 13.25 | 6.65 |

Modifying the sample window 68 based on speed extends the usability of the equations to determine the driveline torque. The sample window 68 becomes larger to capture a full signal period to allow lower speed operation. The sample window 68 becomes smaller as the speed increases requiring less memory of the control module 5 and providing greater resolution.

A modulation function can be utilized to correct for errors introduced by a differential ratio error. Since the speed of rotation for each of the output member 24 and half-shafts 20, 21 can develop large angle of rotation numbers, any numerical error from the differential ratio can result in large errors in torque estimation. The modulation function corrects these errors and can be expressed as:

$$Rt = \frac{Nhs}{Nom} \qquad [10]$$

where Nom is the number of output member revolutions and Nhs is the number of corresponding revolutions of the respective half-shaft. Using the physical relationship between the output member 24 and the half-shaft(s) 20, 21, including gear ratios, the accumulated angle of rotations are limited thereby avoiding numeric errors. An exemplary software code utilizing the modulation function is shown as the following software program listing in Table 2.

TABLE 2

Software code

```
if Out_ang(i)>=N_HS
    Mod_Out_ang(i)=mod(Out_ang(i), N_HS);
    Out_ang(i)=mod(Out_ang(i), N_HS);
    N_Out_ang(i)=floor(Out_ang(i)/ N_HS);
else
    Mod_Out_ang(i)=Out_ang(i);
    N_Out_ang(i)=0;
end
if ABS_Lft_ang(i)>= N_OS
    Mod_Lft_ang(i)=mod(ABS_Lft_ang(i), N_OS);
    ABS_Lft_ang(i)=mod(ABS_Lft_ang(i), N_OS);
    N_ABS_Lft_ang(i)=floor(ABS_Lft_ang(i)/ N_OS);
else
    Mod_Lft_ang(i)=ABS_Lft_ang(i);
    N_ABS_Lft_ang(i)=0;
end
if ABS_Rght_ang(i)>= N_OS
    Mod_Rght_ang(i)=mod(ABS_Rght_ang(i), N_OS);
    ABS_Rght_ang(i)=mod(ABS_Rght_ang(i), N_OS);
    N_ABS_Rght_ang(i)=floor(ABS_Rght_ang(i)/ N_OS);
else
    Mod_Rght_ang(i)=ABS_Rght_ang(i);
    N_ABS_Rght_ang(i)=0;
end
if N_ABS_Rght_ang(i)==N_ABS_Lft_ang(i)
    if N_ABS_Rght_ang(i)* N_HS ==N_Out_ang(i)* N_OS
        ABS_ang_Avg(i)=(Mod_Lft_ang(i)+Mod_Rght_ang(i))/2;
        Out_ang_fnl(i)=ABS_ang_Avg(i)*Rt;
        if abs(-Out_ang_fnl(i)+Mod_Out_ang(i))<2
            Out_ang_dff(i)=(-Out_ang_fnl(i)+Mod_Out_ang(i))*2*pi;
            Tq_eq(i)=Keq*Out_ang_dff(i);
        else
            Out_ang_dff(i)=Out_ang_dff(i- 1);
            Tq_eq(i)=Keq*Out_ang_dff(i);
        end
    end
end
```

Out_ang(i) is the angle of the output member 24, Mod_Out_ang(i) is the remaining angle of the output member 24 after modulation, N_Out_ang(i) is the number of full rotations of the output member 24 at modulation, ABS_Lft_ang(i) is the angle of the second rotational sensor 42, Mod_Lft_ang(i) is the modified angle of the second rotational sensor 42, N_ABS_Lft_ang(i) is the number of full rotations of the output member 24 at modulation, ABS_Rght_ang(i) is the angle of the first rotational sensor 40, Mod_Rght_ang(i) is the modified angle of the first rotational sensor 40, N_ABS_Rght_ang (i) is the number of full rotations of the output member 40 at modulation, ABS_ang_Avg(i) is the average angle of the first and second rotational sensors 40, 42 after modulation, Out_ang_fnl(i) is the average angle for the first and second rotational sensors 40, 42 modified by the differential ratio, and Tq_eq(i) is the final torque for the system.

Numerical error can be avoided by calculating the increment of twist in the output member 24. A recursive equation, an equation involving repeated application of a function to its own values, to find the numerical error can be found by substituting Eq. [4] into Eq. [9] to obtain the following equation to accumulate rotation angle differences between the output sensor 38 and first and second rotational sensors 40, 42.

$$\Theta rot(N) = \sum_{i=1...N} \Phi om(i) - \left(\frac{\sum_{i=1...N} \Phi 1(i) + \sum_{i=1...N} \Phi 2(i)}{2}\right) \cdot Rt \quad [11]$$

And the difference in the rotation angles during the latest sample window between the output sensor 38 and first and second output sensors 40, 42 can be written as follows.

$$\Theta rot(N) = \Theta rot(N-1) + \left[\Phi om(N) - \left(\frac{\Phi 1(N) + \Phi 2(N)}{2}\right) \cdot Rt\right] \quad [12]$$

Figure 3:
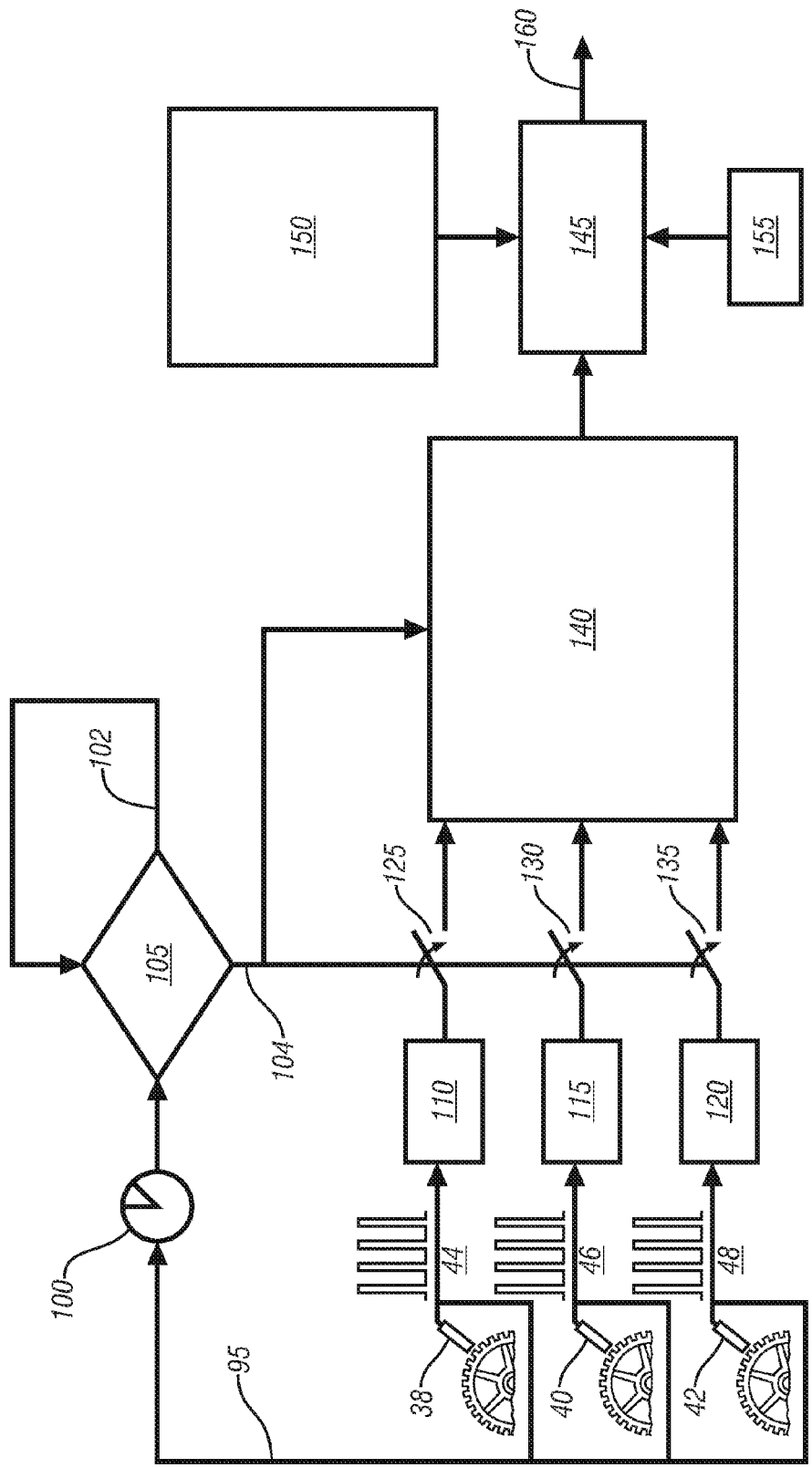
FIG. 3 depicts an exemplary control scheme for calculating torque from rotational sensor data, in accordance with an embodiment of the disclosure.

FIG. 3 depicts an exemplary control scheme for calculating torque from rotational sensor data in accordance with an embodiment of the disclosure. As the vehicle begins to accelerate, the output member, first, and second rotational sensors 38, 40, 42 produce output member speed data 44, first speed data 46, and second speed data 48, respectively and collectively known as speed data 95. The output member speed data 44 is output to a timer 100 and an output member buffer 110. The first speed data 46 is output to the timer 100 and a first speed buffer 115. The second speed data 48 is output the timer 100 and a second speed buffer 120. The timer 100 monitors the speed data 95 and compares the speed data 95 to the largest sample window 68 available, i.e., a sample window 68 that has at least one full signal period included in, for example, Table 1, at 105. If the speed data 95 does not include at least one full signal period in addition to a preceding partial signal period and a subsequent partial signal period, the timer 100 continues monitoring 102. When the timer 100 determines the speed data 95 includes a full signal period at 105 for each of the speed data 95, the timer 100 follows path 104 and switches a first switch 125, second switch 130, and third switch 135 respective to the output member buffer 110, first speed buffer 115, and second speed buffer 120. The buffered data from the output buffer 110, first speed buffer 115, and second speed buffer 120 is passed to a calculation block 140 for computing torque, as described above with respect to FIG. 2.

The computed torque from block 140 is input to block 145 for offset correction. Offset correction block 145 also receives a model torque estimation input from block 150 and vehicle acceleration data from block 155. The model torque from block 150 calculates transmission output torque based on engine output torque, accounting for torque multiplication through torque converter, computed driveline losses and transmission ratios. Block 150 may also calculate transmission output torque based on electric machine torque. The vehicle acceleration data from block 155 includes acceleration data from accelerometers remotely located and calculated acceleration from a speed sensor both of which may be accessed over a communications bus. The offset correction block 145 compares the calculated torque 140 and the model torque estimation 150 to determine a correct reference point for the calculated torque from block 140. A torque variation rate is compared to determine if the variation between the computed torque 145 and the model torque estimation 150 is within an expected range. The offset correction 145 occurs when the variation between the computed torque 145 and estimated torque are within the normal range. The offset corrected torque 145 is output 160 for use in control of the powertrain system 26 in response to the operator torque request using a suitable torque control scheme.

Figure 4:
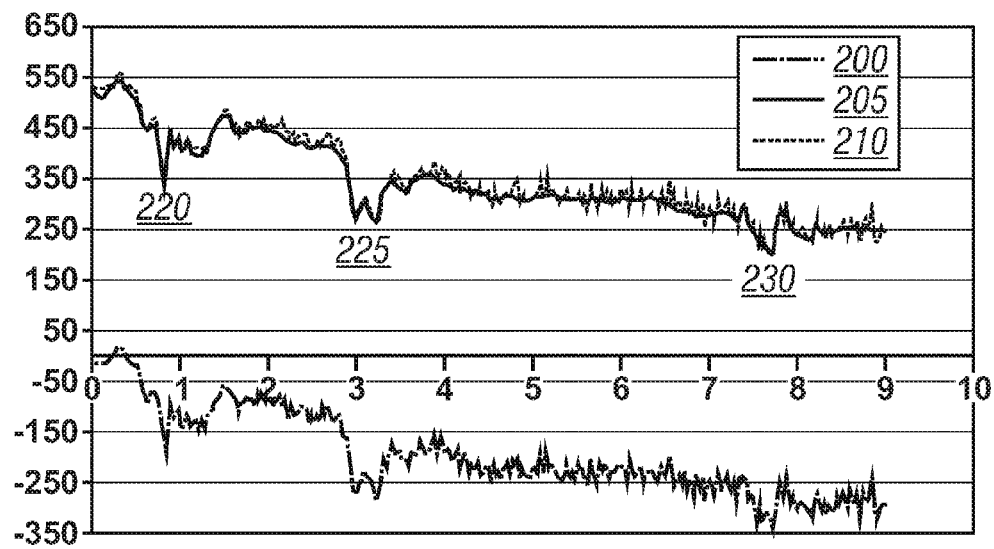
FIG. 4 is graphical data taken from operation of an embodiment of the disclosure during vehicle operation at light throttle during transmission upshifts for first gear through fourth gear including calculated torque, measured torque, and calculated torque offset over time, in accordance with the present disclosure.

FIG. 4 is graphical data taken from operation of an embodiment of the disclosure during vehicle operation at light throttle (10-15.3%) during transmission upshifts for first gear through fourth gear including calculated torque 200, measured torque 205, and calculated torque offset 210 over time. The vehicle is accelerated at light throttle with shift for first to second gear indicated at 220, second to third gear indicated at 225, and third to fourth gear at 230. The calculated torque 200 is the torque as calculated by the above method without the offset factor calculated into the results. The measured torque 205 is measured directly by a torque sensor located on the output member 24 for comparison. The calculated torque offset 210 is the calculated torque which is offset corrected to illustrate the accuracy of the torque variation calculated from the method. Once the calculated torque offset 210 is factored into the results, the results show very good correlation between the calculated torque 200 and the measured torque 205.

Figure 5:
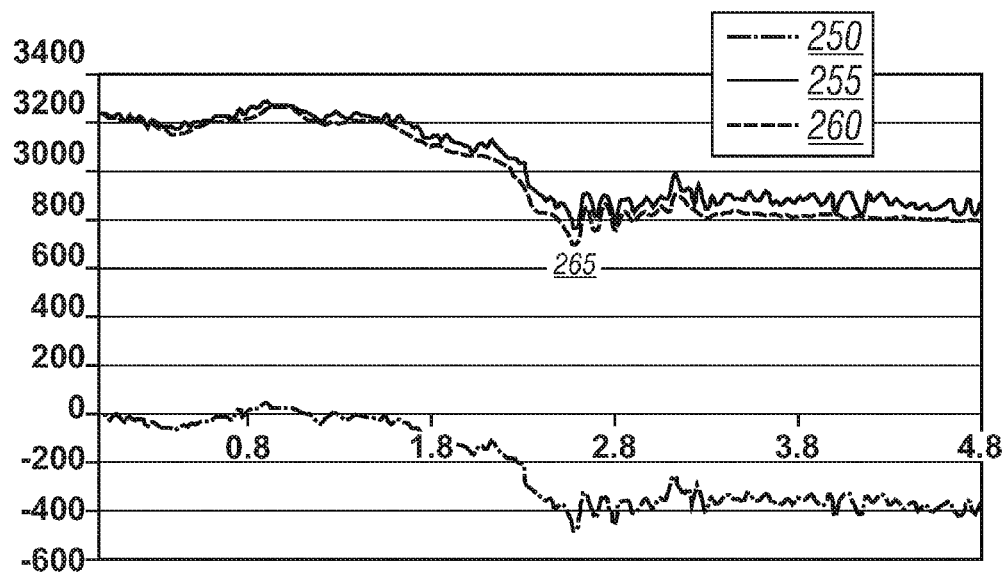
FIG. 5 is graphical data taken from operation of an embodiment of the disclosure during vehicle operation at full throttle during operation in first and second gears including a transmission upshift including calculated torque, calculated torque offset, and measured torque over time, in accordance with the present disclosure.

FIG. 5 is graphical data taken from operating an embodiment of the disclosure during vehicle operation at full throttle during operation in first and second gears including a transmission upshift indicated at 265 including calculated torque 250, calculated torque offset 255, and measured torque 260 over time. To obtain these graphs, the vehicle is accelerated at full throttle through first and second gears with a shift occurring between first and second gears indicated at 265. The calculated torque 250 is the torque calculated by the above method without the offset factor calculated into the results. The calculated torque offset 255 is the torque as calculated by the above method with the offset factor calculated into the results. The measured torque 260 is measured directly by a torque sensor located on the output member 24 for comparison. Once the calculated torque offset 255 is factored into the results, the results indicate very good correlation between the disclosed method and the measured torque 260.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:
1. Method for monitoring torque in a powertrain including a transmission coupled to a driveline, the method comprising:
    monitoring signals from first and second rotational sensors located at respective first and second rotationally-coupled positions of the driveline separated by a distance along the driveline;

determining rotation of the driveline at the first and second rotationally-coupled positions from said signals;

determining a twist angle derived from a difference between the rotations of the driveline at the first and second rotationally-coupled positions;

calculating a driveline torque corresponding to the twist angle; and controlling operation of the powertrain in response to the driveline torque;

wherein signals from said rotational sensors comprise periodic signals, and wherein determining rotation of the driveline at the first and second rotationally-coupled positions from said signals comprises, for each respective rotationally-coupled position, determining an initial phase angle corresponding to an initial signal within a predetermined sample window;

determining a final phase angle corresponding to a final signal within the predetermined sample window;

determining an intermediate phase angle corresponding to the number of full signals between the initial signal and the final signal; and determining the rotation of the driveline at the respective rotationally-coupled position as a summation of the initial phase angle, the final phase angle and the intermediate phase angle.

2. The method of claim 1, wherein the initial signal within the predetermined sample window consists of a partial signal.

3. The method of claim 1, wherein the final signal within the predetermined sample window consists of a partial signal.

4. The method of claim 1, wherein each of the initial signal and the final signal consists of a respective partial signal.

5. The method of claim 4, wherein the sum of the initial phase angle and the final phase angle is equivalent to an angle corresponding to a full signal.

6. The method of claim 1, wherein the first rotationally-coupled position of the driveline comprise a position on a transmission output member proximal to the transmission and wherein the second rotationally-coupled position of the driveline comprise a position on a half-shaft.

7. The method of claim 1, wherein the first rotationally-coupled position of the driveline comprises a position on a transmission output member proximal to the transmission and wherein the second rotationally-coupled position of the driveline comprises a position on the transmission output member distal relative to the first rotationally-coupled position.

8. The method of claim 1, wherein the powertrain further includes an electric machine and the first rotational sensor comprises a resolver configured to monitor rotation of the electric machine.

9. Method for monitoring torque in a powertrain including a transmission coupled to a driveline, the method comprising:

monitoring signals from first and second rotational sensors located at respective first and second rotationally-coupled positions of the driveline separated by a distance along the driveline;

determining rotation of the driveline at the first and second rotationally-coupled positions from said signals;

determining a twist angle derived from a difference between the rotations of the driveline at the first and second rotationally-coupled positions;

calculating a driveline torque corresponding to the twist angle; and controlling operation of the powertrain in response to the driveline torque;

wherein determining the twist angle derived from the difference between the rotations of the driveline at the first and second rotationally-coupled positions comprises determining an error correction by a modulation function.

10. The method of claim 9, wherein said correction by the modulation function comprises comparing a physical relationship between the rotations at the first and second positions.

11. Method for monitoring torque in a powertrain including a transmission coupled to a driveline, the method comprising:

monitoring periodic signals from first and second rotational sensors located at respective first and second rotationally-coupled positions of the driveline, said first rotationally-coupled position located on a transmission output member proximal to the transmission, and said second rotationally-coupled position located on a half-shaft;

determining for each respective rotational sensor a respective initial phase angle corresponding to a respective initial signal within a predetermined sample window;

determining for each respective rotational sensor a respective final phase angle corresponding to a respective final signal within the predetermined sample window;

determining for each respective rotational sensor a respective intermediate phase angle corresponding to the respective number of full signals between the respective initial signal and the respective final signal;

determining the rotation of the driveline at the respective rotationally-coupled position as a summation of the respective initial phase angle, the respective final phase angle and the respective intermediate phase angle;

determining a twist angle from a difference between the rotations of the driveline at the first and second rotationally-coupled positions;

calculating a driveline torque corresponding to the twist angle; and controlling operation of the powertrain in response to the driveline torque.

12. The method of claim 11, wherein the initial signal within the predetermined sample window consists of a partial signal, wherein the final signal within the predetermined sample window consists of a partial signal, and wherein the sum of the initial phase angle and the final phase angle is equivalent to an angle corresponding to a full signal.

13. Method for monitoring torque in a powertrain including a transmission coupled to a driveline, the method comprising:

monitoring periodic signals from first and second rotational sensors located at respective first and second rotationally-coupled positions of the driveline, said first rotationally-coupled position located on a transmission output member proximal to the transmission, and said second rotationally-coupled position located on the transmission output member distal relative to the first rotationally-coupled position;

determining for each respective rotational sensor a respective initial phase angle corresponding to a respective initial signal within a predetermined sample window;

determining for each respective rotational sensor a respective final phase angle corresponding to a respective final signal within the predetermined sample window;

determining for each respective rotational sensor a respective intermediate phase angle corresponding to the respective number of full signals between the respective initial signal and the respective final signal;

determining the rotation of the driveline at the respective rotationally-coupled position as a summation of the respective initial phase angle, the respective final phase angle and the respective intermediate phase angle;

determining a twist angle from a difference between the rotations of the driveline at the first and second rotationally-coupled positions;

calculating a driveline torque corresponding to the twist angle; and controlling operation of the powertrain in response to the driveline torque.

14. The method of claim 13, wherein the initial signal within the predetermined sample window consists of a partial signal, wherein the final signal within the predetermined sample window consists of a partial signal, and wherein the sum of the initial phase angle and the final phase angle is equivalent to an angle corresponding to a full signal.

* * * * *